United States Patent Office 2,976,314
Patented Mar. 21, 1961

2,976,314
METHOD FOR PREPARATION OF TRIALKYL BORATES

Carlos M. Bowman and Edward J. Watson, Midland, Mich., assignors to The Dow Chemical Company, Midland, Mich., a corporation of Delaware No Drawing. Filed Mar. 2, 1959, Ser. No. 796,297

6 Claims. (Cl. 260—462)

This invention relates to an improved method for the preparation of trialkyl borates. These compounds have the general formula:

$$\begin{array}{c} R-O \\ R-O-B \\ R-O \end{array}$$

wherein R represents a lower alkyl radical containing from 1 to 8 carbon atoms and B is the boron atom.

Most of the known practical methods of preparing lower alkyl borates yield an alcohol-trialkyl borate azeotrope from which the desired product must be separated. This separation procedure by the known methods is, in most instances, both lengthy and troublesome. In the method of the present invention, however, trialkyl borates may be prepared by means which obviate the separation of the desired product from azeotropic mixtures. A minimum number of procedural steps are required and the desired product is obtained in high yields and in a very pure state.

The method of the present invention includes the reacting of boric oxide, $B_2O_3$, with a 2,2-dialkoxypropane having the formula:

wherein R is a lower alkyl group containing from 1 to 8 carbon atoms, and heating the reaction mixture to a temperature between about 0° C. and about 200° C., preferably at the boiling temperature of the reaction mixture, whereby a trialkyl borate may be produced. The reaction proceeds according to the equation:

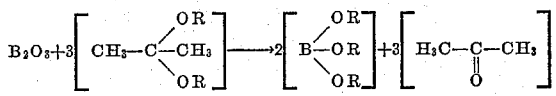

Acetone is produced as a by-product. The major portion of the acetone formed is distilled off or otherwise removed. Any unreacted 2,2-dialkoxypropane is also generally removed. During the heating, the reaction temperature gradually rises during a first fraction distillation, and thereafter, a second fraction is distilled off. This second fraction comprises a small portion of the desired product along with the remainder of the by-product. The major portion of the desired product is thereafter distilled off and collected.

The following examples illustrate the invention but are not to be construed as limiting:

Example I 312 grams (3.0 moles) of 2,2-dimethoxypropane were mixed with 70 grams (1.0 mole) of boric oxide in a 1-liter round-bottom flask connected to a distillation column and equipped with a heating mantle, and the mixture heated for one hour at 54° C.±2° C. The by-product acetone formed was removed from the reaction flask by distillation during the course of the heating. Continued heating after the major portion of the acetone had been removed resulted in a gradual increase in the reaction temperature. The final traces of the acetone and the initial portion of the trimethyl borate distilled over between 54° C. and 67° C. Then at 68-70° C., 195 grams (94 percent of the theoretical yield) of trimethyl borate were distilled and collected.

The trimethyl borate thus prepared was 99 percent pure as confirmed by infra-red analysis.

Example II 396 grams (3.0 moles) of 2,2-diethoxypropane were mixed with 70 grams (1.0 mole) of boric oxide in a 1-liter round-bottom flask equipped similarly to that in Example I, and the mixture heated for one hour at 54-56° C. The by-product acetone formed was removed from the reaction flask by distillation during the course of the heating. Continued heating after the major portion of the acetone had been removed resulted in a gradual increase in the reaction temperature. The final traces of the acetone and the initial portion of the triethyl borate distilled over between 70° C. and 115° C. Then at 117-118° C., 180 grams (75 percent of the theoretical yield) of water-white triethyl borate were distilled and collected. The triethyl borate thus prepared was 95 percent pure as confirmed by infra-red analysis.

While the above examples describe specific starting compounds, other starting compounds may be employed, for example, 2,2-dipropoxypropane;
2,2-diisopropoxypropane;
2,2-dibutoxypropane;
2,2-bis(2-methylpropoxy)propane;
2,2-dipentoxypropane;
2,2-bis(3-methylbutoxy)propane;
2,2-dihexoxypropane;
2,2-bis(2-methylpentoxy)propane;
2,2-diheptoxypropane;
2,2-bis(4-methylhexoxy)propane;
2,2-bis(3-ethylpentoxy)propane;
2,2-dioctoxypropane;
2,2-bis(5-propylpentoxy)propane;
2,2-bis(4-methylheptoxy)propane;

and the like may be employed, and analogous final products obtained therefrom.

Various modifications may be made in the present invention without departing from the spirit or scope thereof, and it is to be understood that we limit ourselves only as defined in the appended claims.

We claim:

1. A method for preparing boron-containing esters comprising reacting, at a temperature of between about 0° C. and about 200° C. boric oxide with a compound having the formula:

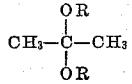

wherein R is a lower alkyl radical containing from 1 to 8 carbon atoms, and separating the resulting trialkyl borate from the reaction mixture.

2. A method for preparing boron-containing esters comprising, reacting, at a temperature of between about 50° C. and about 150° C. boric oxide with a compound having the formula:

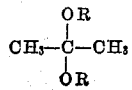

wherein R is a lower alkyl radical containing from 1 to 8 carbon atoms, and separating the resulting trialkyl borate from the reaction mixture.

3. A method for preparing boron-containing esters comprising, reacting, at a temperature of between about 0° C. and about 200° C. boric oxide with a compound having the formula:

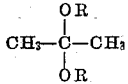

wherein R is a lower alkyl radical containing from 1 to 8 carbon atoms, removing from the reaction mixture by distillation the by-products of the reaction and any unreacted starting materials, and separating the trialkyl borate from the reaction mixture.

4. A method for preparing boron-containing esters comprising, reacting, at a temperature of between about 50° C. and about 150° C. boric oxide with a compound having the formula:

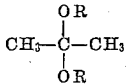

wherein R is a lower alkyl radical containing from 1 to 8 carbon atoms, removing from the reaction mixture by distillation the by-products of the reaction and any unreacted starting materials, and separating the trialkyl borate from the reaction mixture.

5. A method for preparing trimethyl borate comprising, reacting, at a temperature of between about 0° C. and about 100° C. boric oxide with a compound having the formula:

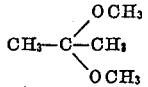

and separating the resulting trimethyl borate from the reaction mixture.

6. A method for preparing triethyl borate comprising, reacting, at a temperature of between about 50° C. and about 125° C. boric oxide with a compound having the formula:

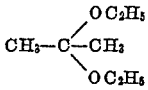

and separating the resulting triethyl borate from the reaction mixture.

No references cited.